T. J. & G. W. MONTGOMERY.
CULTIVATOR.

No. 173,554. Patented Feb. 15, 1876.

UNITED STATES PATENT OFFICE.

THOMAS J. MONTGOMERY AND GEORGE W. MONTGOMERY, OF WINCHESTER, TENNESSEE.

IMPROVEMENT IN CULTIVATORS.

Specification forming part of Letters Patent No. 173,554, dated February 15, 1876; application filed September 17, 1875.

*To all whom it may concern:*

Figure 1:
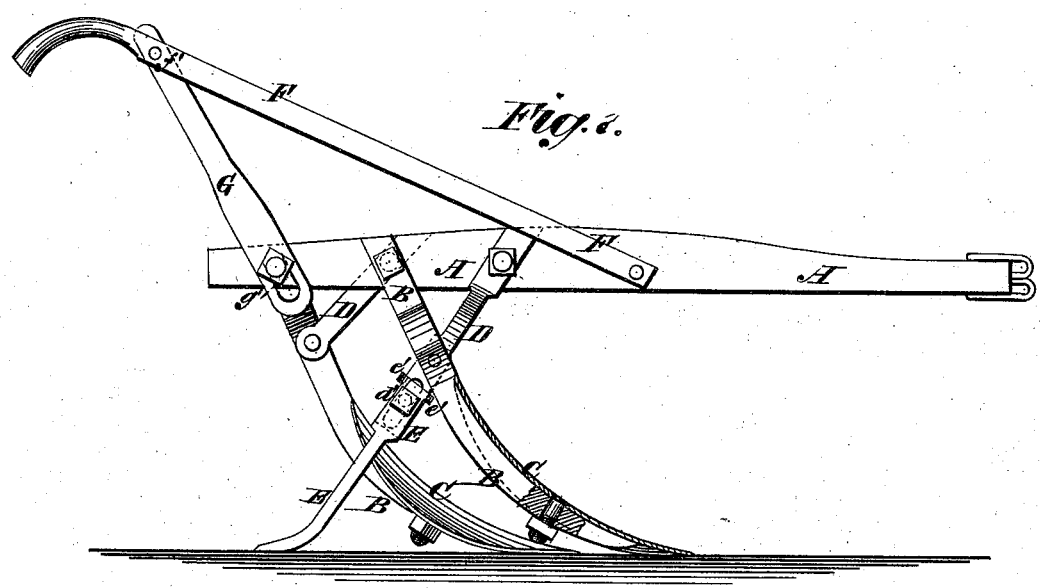
Figure 2:
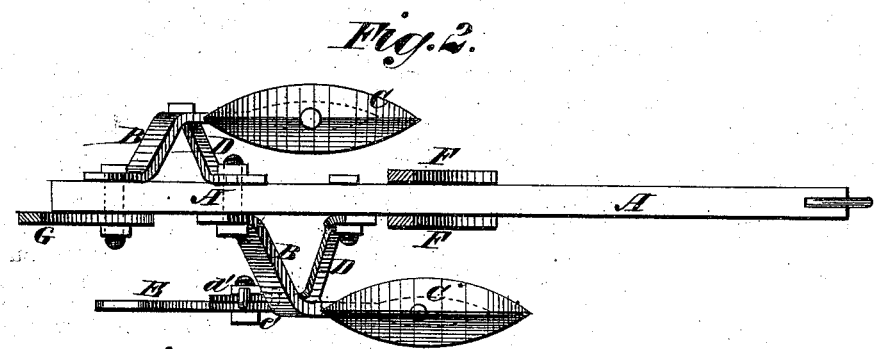
Figure 3:
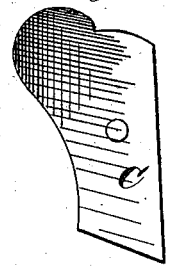
Figure 4:
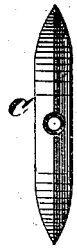

Be it known that we, THOMAS J. MONTGOMERY and GEORGE W. MONTGOMERY, of Winchester, in the county of Franklin and State of Tennessee, have invented a new and useful Improvement in Double Cultivating-Plow, of which the following is a specification:

Figure 1 is a side view of our improved plow. Fig. 2 is a top view of the same, the handles and their upright being cut off. Fig. 3 is a detail view of the turn-plow. Fig. 4 is a detail view of the double-pointed bull-tongue plow.

Similar letters of reference indicate corresponding parts.

The object of this invention is to furnish an improved double plow for cultivating corn, cotton, and other plants planted in rows or drills, which shall be simple in construction, of light draft, and convenient in use, running steadily, and being easily held, and which may be readily adjusted to work at any desired depth in the ground.

The invention will first be described in connection with drawing, and then pointed out in the claim.

A is the plow-beam, to the opposite sides of the rear part of which, and the one at a suitable distance in front of the other, are attached the upper ends of two standards, B. The standards B are curved outward to bring the plows at the proper distance apart, and then downward, and their lower parts are curved forward to form seats for the plows C.

The plows C may be turn-plows, as shown in Fig. 3, or double-pointed shovel-plows, as shown in Figs. 1 and 2, or double-pointed bull-tongues, as shown in Fig. 4. A turn plow may be attached to one of the standards, and a double-pointed shovel, or a double-pointed bull-tongue, to the other, or two shovels or two bull-tongues, or a shovel and a bull-tongue, according to the kind of work to be done. By making the shovels and bull-tongues double-pointed they may be reversed when worn, and will thus last twice as long as single-pointed plows without materially increasing the cost.

The plows C are secured to the standards B with bolts and nuts, so that they can be conveniently attached and detached when desired.

The draft-strain upon the standards B is sustained by the braces D, the forward ends of which are bolted to the beam A, and their rear ends are bolted to the said standards B. The rear end of the brace D of the forward standard B is extended, and the extension $d'$ is slotted longitudinally, to receive the bolt by which the upper end of the bar E is secured to it. The upper end of the bar E has lugs or flanges $e$ formed upon its side edges, to overlap the side edges of the extension $d'$, and keep the bar E from turning upon its bolt. The rear end of the bar E is bent to the rearward to serve as a runner to slide along the ground. The bar E thus acts as a guard to keep the machine erect and cause it to run steady and smooth, and as a gage to regulate the depth to which the plows may enter the ground. F are the handles, the forward ends of which are secured and pivoted to the opposite sides of the middle part of the beam A, and the rear parts of which are supported in position by the round $f'$, the middle part of which passes through and is secured to the upper end of the upright G. The lower end of the upright G is slotted longitudinally to receive the bolt $g'$ by which it is secured to the rear end of the beam A, so that by loosening the said bolt $g'$ the handles may be raised and lowered to adjust them to the height of the plowman.

Having thus described our invention, we claim as new and desire to secure by Letters-Patent—

The combination of the outwardly, downwardly, and forwardly curved standard B, the extension-braces D $d'$, and the flanged bar E $e'$, all constructed and arranged as and for the purpose specified.

THOMAS J. MONTGOMERY.
GEORGE W. MONTGOMERY.

Witnesses:
H. T. CARR,
T. M. PRYOR.